United States Patent [19]

Tetzlaff et al.

[11] Patent Number: 4,824,534
[45] Date of Patent: Apr. 25, 1989

[54] PROCESS FOR ELECTRICALLY SEPARATING THE ELECTROLYTE-BEARING MAINS FROM THE ELECTROLYTE SPACES OF AN ELECTROCHEMICAL CELL PILE

[75] Inventors: Karl-Heinz Tetzlaff, Kelkheim; Dieter Schmid, Schwalbach; Jürgen Russow, Kelkheim, all of Fed. Rep. of Germany

[73] Assignee: Hoechst Aktiengesellschaft, Fed. Rep. of Germany

[21] Appl. No.: 11,936

[22] Filed: Feb. 6, 1987

Related U.S. Application Data

[63] Continuation of Ser. No. 776,898, Sep. 17, 1985, abandoned.

[30] Foreign Application Priority Data

Sep. 19, 1984 [DE] Fed. Rep. of Germany ....... 3434328

[51] Int. Cl.⁴ .............................................. C25B 1/00
[52] U.S. Cl. ..................................... 204/128; 204/95; 204/98; 204/242; 204/256; 204/255; 204/268; 204/269; 204/275; 204/257; 429/14; 429/18
[58] Field of Search .................. 204/95, 98, 128, 242, 204/252, 256, 255, 257, 263, 268, 269, 275; 429/14, 15, 18, 17

[56] References Cited

U.S. PATENT DOCUMENTS 2,673,232  3/1954  Silsby, Jr. ............................ 204/275
4,032,424  6/1977  Peters et al. ........................ 204/255

FOREIGN PATENT DOCUMENTS 0514501  5/1929  Fed. Rep. of Germany ...... 204/263

Primary Examiner—John F. Niebling
Assistant Examiner—Kathryn Gorgos
Attorney, Agent, or Firm—Connolly and Hutz

[57] ABSTRACT

In this process for electrically separating the electrolyte-bearing main from the electrolyte spaces of an electrochemical cell pile, the electrolyte is passed via drop sections directly from the main into the electrolyte space or directly from the electrolyte space into the main.

5 Claims, 3 Drawing Sheets

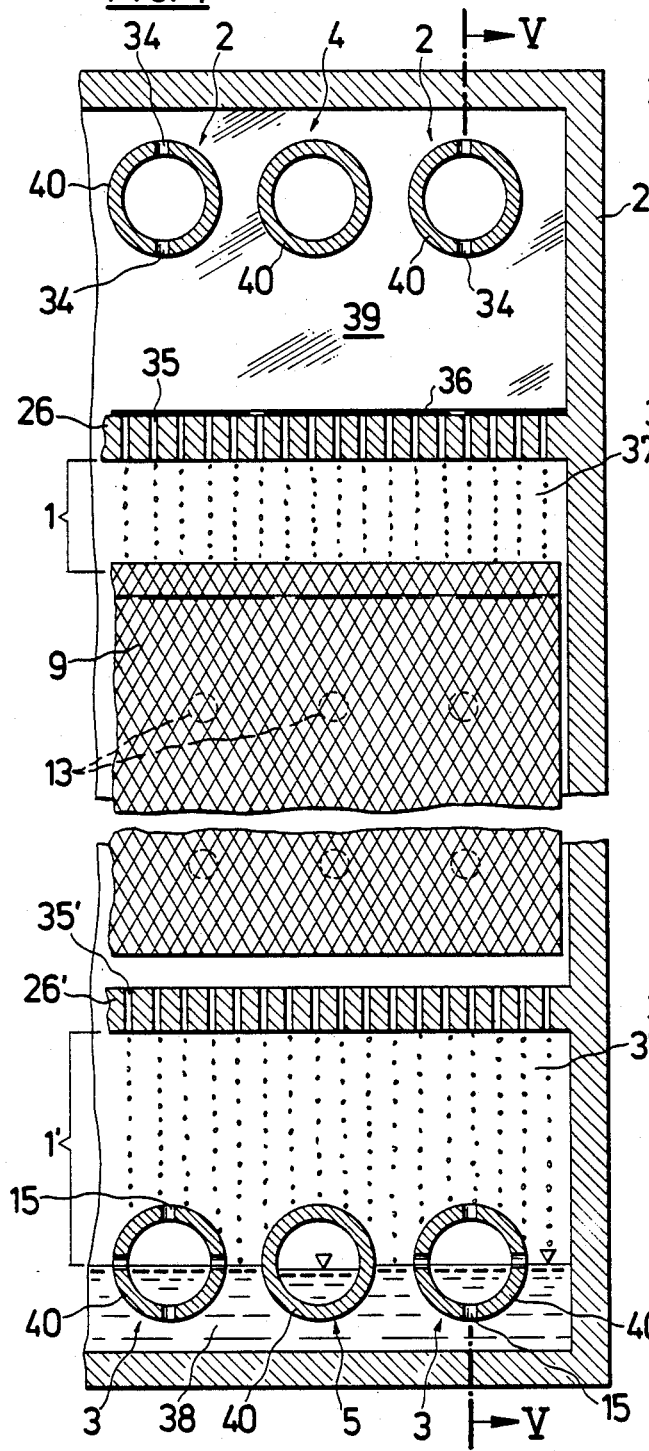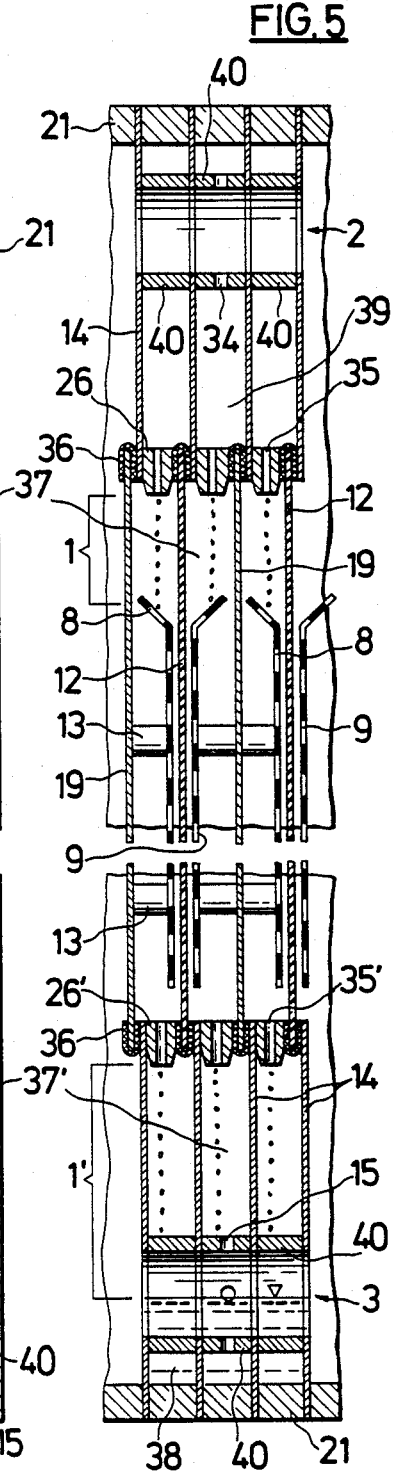
FIG. 4
FIG. 5

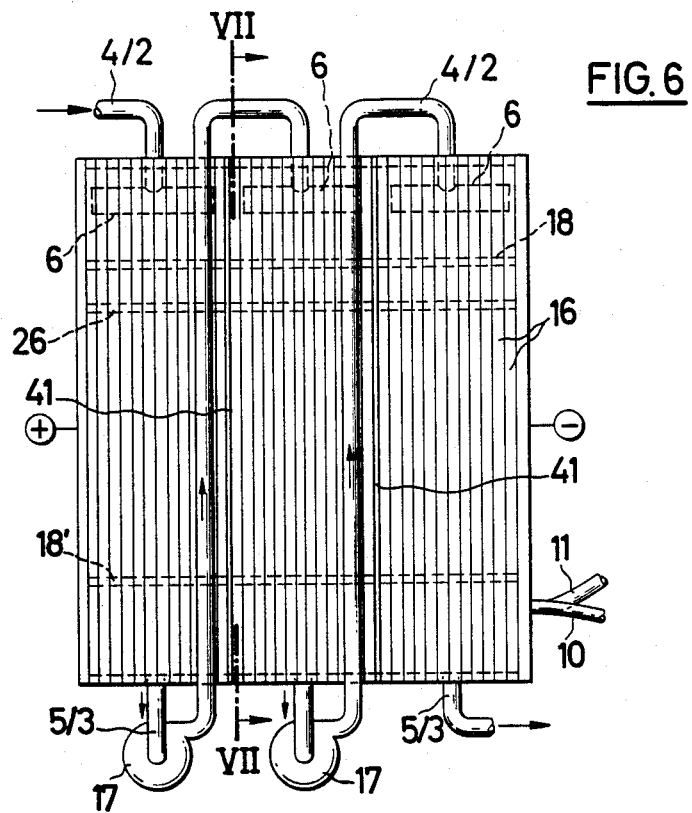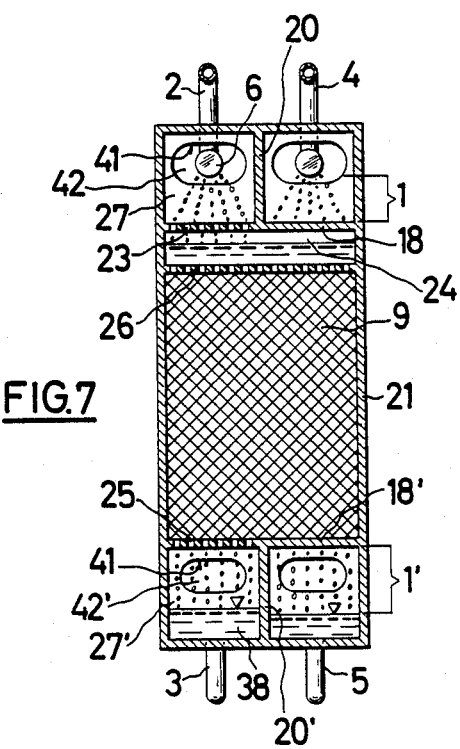

PROCESS FOR ELECTRICALLY SEPARATING THE ELECTROLYTE-BEARING MAINS FROM THE ELECTROLYTE SPACES OF AN ELECTROCHEMICAL CELL PILE

CROSS-REFERENCE TO RELATED APPLICATION

This application is a continuation application of Ser. No. 776,898 filed Sept. 17, 1985 now abandoned.

The invention relates to a process for electrically separating the electrolyte-bearing mains and the electrolyte spaces of an electrochemical cell pile by means of drop sections, and to an electrochemical apparatus for carrying out this process.

The process is suitable for all electrochemical processes in which an electrolyte has to be fed in or discharged in a liquid form. The fields of application are electrolysis, electrodialysis and the operation of fuel cells and batteries. The process is applicable to partitioned and unpartitioned cells. The cells can be connected in either a bipolar or a monopolar mode. It is applicable to both cell constructions with flooded electrolyte spaces and to so-called falling film cells, in which the electrolyte flows in a thin layer along the electrodes, utilizing gravity.

When electrochemical cells operating at different voltage levels are connected to an electrolyte-bearing main, electrical loss currents are generated which reduce the efficiency and cause corrosion damage to cells and peripheral parts of the unit. In order to minimize the loss of current in cells connected in the bipolar mode, the individual cells are connected to the main via long thin plastic lines. These measures cannot be fully satisfactory for a bipolar cell pile in large industrial units with a voltage of several hundred volt. In addition, the long thin connection lines prevent the establishment of a constant pressure in the cells and cause pressure fluctuations, in particular in the case of two-phase flows.

U.S. Pat. No. 4,032,424 has disclosed an apparatus for interrupting the flow of electric current by means of a mixed stream of gas and liquid, which apparatus is installed in particular in the outlet lines of membrane cells. The apparatus essentially comprises a device, by means of which the liquid stream can be converted into a drop section. A disadvantage is the additional expense of a further device in the feed and discharge lines of the membrane electrolysis cells.

The object of the invention now is to eliminate the electrical loss of currents due to the feed and discharge of the electrolytes by means of a simple process or a simple, space-saving arrangement.

The object is achieved by a process which comprises passing the electrolyte through drop sections directly from the main into the electrolyte space or directly from the electrolyte space into the main.

The electrochemical apparatus for carrying out the process according to the invention comprises devices for generating drops, which devices are located above the cell pile and at the outlet of the electrolyte spaces. Devices for generating drops are known per se in chemical equipment construction. Distributor channels can be provided between the electrolyte spaces and the devices for generating drops. The electrolyte spaces can be provided with an overflow device. Overflow devices are necessary in the case of flooded electrolyte spaces. In the case of electrolyte spaces which have only a defined absorption capacity for the electrolyte, overflow devices can discharge the excess rate fed in via a drop section and facilitate the process in this way.

The electrolyte is thus fed to the cell via a drop section and likewise leaves the cell via a drop section. The drop sections can be arranged inside or outside the cell pile. The spatial arrangement of the electrodes can be as desired, but is preferably vertical.

The proposed invention enables the electrolyte spaces to be completely separated electrically from the feed and discharge mains and avoids energy losses and corrosion in a simple manner. The invention can also be applied to very thin cells such as, for example, falling film cells. In addition, further economic advantages are obtained by providing the drop sections inside a pressure vessel.

The invention is described by way of example with reference to FIGS. 1 to 7. Only bipolar arrangements are shown. The devices for clamping and supporting the cell piles are not shown. Vessels in which the cell piles are arranged are shown only diagrammatically. FIG. 3 shows an arrangement with flooded interior, and all the other illustrations show so-called falling film cells.

In detail:

FIG. 4 shows a longitudinal section of a cell pile with internally arranged drop sections and a view of the anode;

FIG. 5 shows the section V—V of FIG. 4;

FIG. 6 shows a cell pile with electrolyte spaces partitioned several times for different types of electrolyte; and FIG. 7 shows the section VII—VII of FIG. 6.

Figure 1:
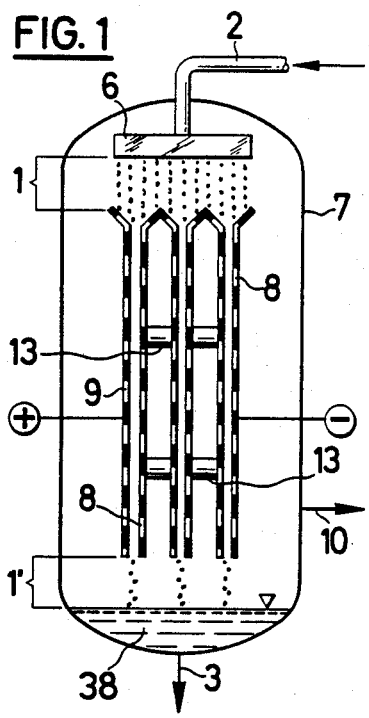
FIG. 1 shows an unpartitioned cell pile with perforated electrodes in a vessel.

FIG. 1 shows an unpartitioned electrolysis cell with perforated electrodes 8, 9, which cell is suitable for the production of chlorate. The cell pile in bipolar connection is arranged in a vessel 7. The brine from the main 2 is divided by devices 6 into drops, so that a drop section 1 is formed between these devices 6 and the cell pile. Such a structure ensures that the electrolyte reaches the electrodes 8 and 9. The electrolyte flows downward, wetting both electrodes. The gas evolved on the back of the electrodes from the thin electrolyte film can escape downwards or laterally. It is extracted from the vessel 7 by means of line 10. When dropping off the electrodes, the electrolyte forms a drop section 1' and leaves the vessel 7, if appropriate together with the gas generated, via the main 3. The electrodes are fixed by spacers which are not shown here. The arrangement illustrated can also be used for processes in which no gas is formed. Arrangements according to the so-called falling film principle are extremely compact and can therefore be easily integrated in the vessel 7.

Figure 2:
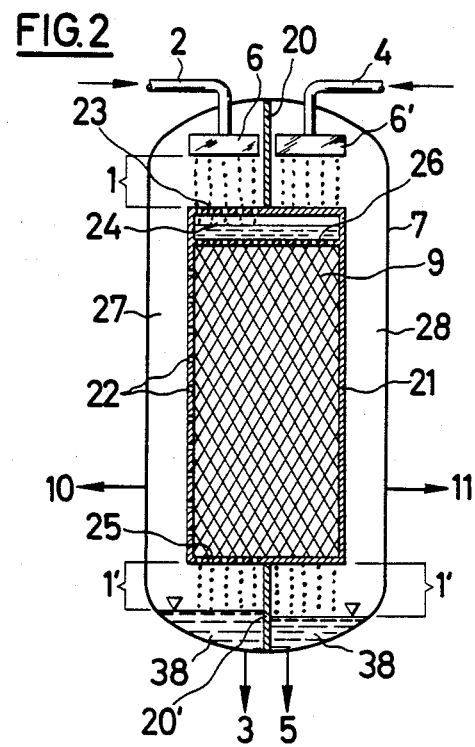
FIG. 2 shows a cell pile in a vessel with partitioned electrolyte spaces, with a view of the anode space of a membrane electrolysis cell.

In the arrangement according to FIG. 2, two gas spaces 27 and 28 are created which are separated from one another by the walls 20, 20'. As a result, particularly simple fuel cells and electrolytic cells can be produced. This also applies to electrolytic cells with gas diffusion electrodes such as, for example, an oxygen-scavenging cathode in the alkali metal chloride electrolysis. For the latter, the anolyte—the brine—is fed through the main 2 to the device 6 for generating drops. From there, the brine in the form of drops reaches the left-hand half of the cell. The brine is passed through holes 23 into a distributor channel which represents a perforated strip 26 with a space 24, located above the strip, for distributing the brine over the cell width. The brine flows through a multiplicity of orifices in the strip 26 onto the anode 9. On the latter, it flows downward as a falling film, wetting the membrane and the anode 9. Through the holes 25, the brine, forming a drop section 1', passes into the vessel 7 and can be discharged via the main 3. The chlorine gas evolved passes via the perforations 22 in the anode frame 21 into the gas space 27 and is discharged via the line 10. The catholyte, which reaches the cell pile via the main 4 and the device 6', flows back into the vessel 7, analogously to the anolyte, wetting the membrane and cathode and is discharged via the line 5. The hydrogen is taken off from the gas space 28 via the line 11. The cathode space is of a shape similar to that of the anode space described above. However, the arrangement of the orifices 23 and 25 is here the mirror image of that described there.

Figure 3:
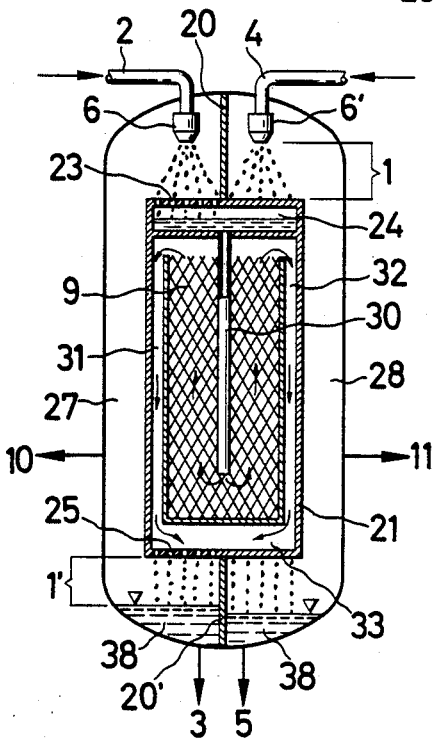
FIG. 3 shows a cell pile as in FIG. 2, but with flooded interior.

FIG. 3 shows a modification of the arrangement according to FIG. 2 for cells with flooded electrolyte spaces. The arrangement is again explained by reference to the example of the alkali metal chloride electrolysis. The anolyte from the main 2 passes via devices 6 (for example nozzles), the drop section 1 and the orifices 23 into the space 24. From there, it flows downward in a pipe 30. The gas-bearing anolyte rises and flows via the spaces 31 and 32 downward into the space 33. The anolyte and the gas enter the gas space 27 through the holes 25. At small throughputs, the spaces 31, 32 and 33 can be omitted, and the gas and electrolyte can then pass through orifices in the frame 21 and suitable devices for generating drops directly into the space 27 (not shown). The anolyte is discharged via the main 3, and the gas is discharged via the line 10. The walls 20, 20' separate the two spaces 27 and 28 from one another. The cathode space is of a shape similar to that of the anode space described above. However, the arrangement of the orifices 23 and 25 is here a mirror image of that described above.

In the cell pile according to FIGS. 4 and 5, the insulating drop sections 1, 1' are arranged within the cell pile. The mains 2, 3, 4 and 5 within this cell pile are constructed from annular components 40, similar to those in a plate heat exchanger. The anolyte is connected only to the anode space. The latter is sealed and insulated from the cathode space. The anode space is sealed from the outside by the surrounding frame 21. Several mains 2 for feeding the anolyte can be arranged within the cell pile. The anolyte flows through orifices 34 into the space 39 and collects on the strip 26. The space 39 can be regarded as a constituent of the main 2 and can be completely flooded. The partitions 14 and seals 36 are made of an insulating material. The orifices 35 and the underside of the strip 26 are shaped in such a way that the anolyte forms a drop section 1.

The strip 26 thus has the task of distributing the electrolyte uniformly over the electrode width and of acting at the same time as a device for generating drops. In the gas space 37, bounded by the membrane 12 and the bipolar partition 19, the drops fall onto the electrodes 8, 9. Wetting the membrane 12 and electrodes 8, 9, the electrolyte then flows downward, where it impinges on a strip 26'. This strip 26' has a function similar to that of the upper strip 26. In the case of gas-evolving electrodes, however, the lower strip 26' has larger orifices 35', so that gas and electrolyte can flow through together. The electrolyte again forms a drip section 1' in the gas space 37'. The gas space can be regarded as a constituent of the main 3. The gas and electrolyte pass through orifices 15 into the main 3, n which they are discharged together. The lower part of the space 37' is filled with electrolyte 38. The mains 4 and 5 for the catholyte are sealed and insulated from the anolyte spaces. The catholyte is passed through the cell pile in the same way as the anolyte. The perforated electrodes 9 and 8 are connected to current leads 13 in the bipolar mode.

FIGS. 6 and 7 show a cell pile with spaces partitioned several times, for different types of electrolyte. FIG. 6 is an elevation showing a multiplicity of individual electrochemical cells 16. FIG. 7 is the section VII—VII of FIG. 6 through the anode space 21, with a view of the anode 9. The anolyte and catholyte can be passed in co-current or counter-current in the manner of a cascade within a cell pile 16. The anolyte enters the cell pile via the main 2 and is sprayed by the device 6, which is designed as a piece of pipe with holes, onto the strips 18 of the first third of the cell pile. A drop section 1 is thus produced in the gas space 27. The anolyte then passes via orifices 23 in the strip 18, which is formed by the space 24 and the strip 26 provided with holes, into the distributor channels. From there, the anolyte flows downward, wetting the anode 9 and the membrane, and is discharged, together with any gas formed, in the form of drops through orifices 25 in the lower strip 18' into the gas space 27'. To avoid pressure fluctuations, it is advantageous to connect the upper and lower gas spaces 27, 27' via a pressure balance line not shown here. The spaces 27, 27' are each divided by partitions 41 into three similar chambers. For the purpose of pressure balance, the partitions 41 are provided with perforations 42, 42'. These perforations 42, 42' also permit separate discharge of the gases from the anolyte and catholyte spaces through pipes 10, 11. The anolyte which has entered through the line 2 is discharged via the line 3 and delivered by means of the pump 17 and atomized. At the end of the cascade, the anolyte leaves the cell pile via the line 3. Due to the cascade arrangement, the concentration and the temperature are continuously changed, so that different types of anolyte are produced. The catholyte is passed through the lines 4 and 5, analogously to the anolyte, likewise in the manner of a cascade. The spaces 27 and 27' for the drop sections 1, 1' are separated gas-tight by partitions 20, 20'. The arrangement of the orifices in the strips 18 and 18' for the catholyte is the mirror image of that for the anolyte.

We claim:

1. A process for electrically separating individual electrolyte spaces of a bipolar electrochemical cell pile from common electrolyte spaces and individual electrolyte spaces from each other, the process comprising the steps of directly delivering an electrolyte in the shape of droplets from a common delivery main to each individual electrolyte space without individual mains, subsequently draining off the electrolyte from the individual electrolyte spaces by forming electrolyte droplets, and delivering the droplets directly into a common exhaust main without individual mains.

2. Apparatus for electrically separating electrolyte common mains from a bipolar electrochemical cell pile and individual cells from each other, the apparatus comprising an electrochemical cell pile having individual electrolyte spaces therein, a common electrolyte delivery main without individual mains spaced above the electrolyte spaces of the cell pile, an electrolyte exhaust main spaced below the electrolyte spaces of the cell pile, an upper drop section between the electrolyte delivery main and an upper end of the electrolyte spaces of the cell pile, a lower drop section between the electrolyte exhaust main and a lower end of the electrolyte spaces of the cell pile, a device for generating electrolyte droplets which pass through the upstream drop section and into the electrolyte spaces of the cell pile, and a second device for generating electrolyte droplets at a lower end of the electrolyte spaces of the cell pile whereby such droplets pass through the lower drop section and into the exhaust main.

3. Apparatus as in claim 2 including distributor channels between the electrolyte spaces of the cell pile and the device for generating electrolyte droplets at the delivery main for distributing the electrolyte directly into electrolyte spaces.

4. Apparatus as in claim 2 including overflows for the electrolyte spaces of the cell pile.

5. Apparatus as in claim 2 including a closed vessel enclosing the cell pile and wherein the upper and lower drop sections are arranged inside the vessel having a common gas space.

* * * * *